United States Patent Office 2,817,405
Patented Dec. 24, 1957

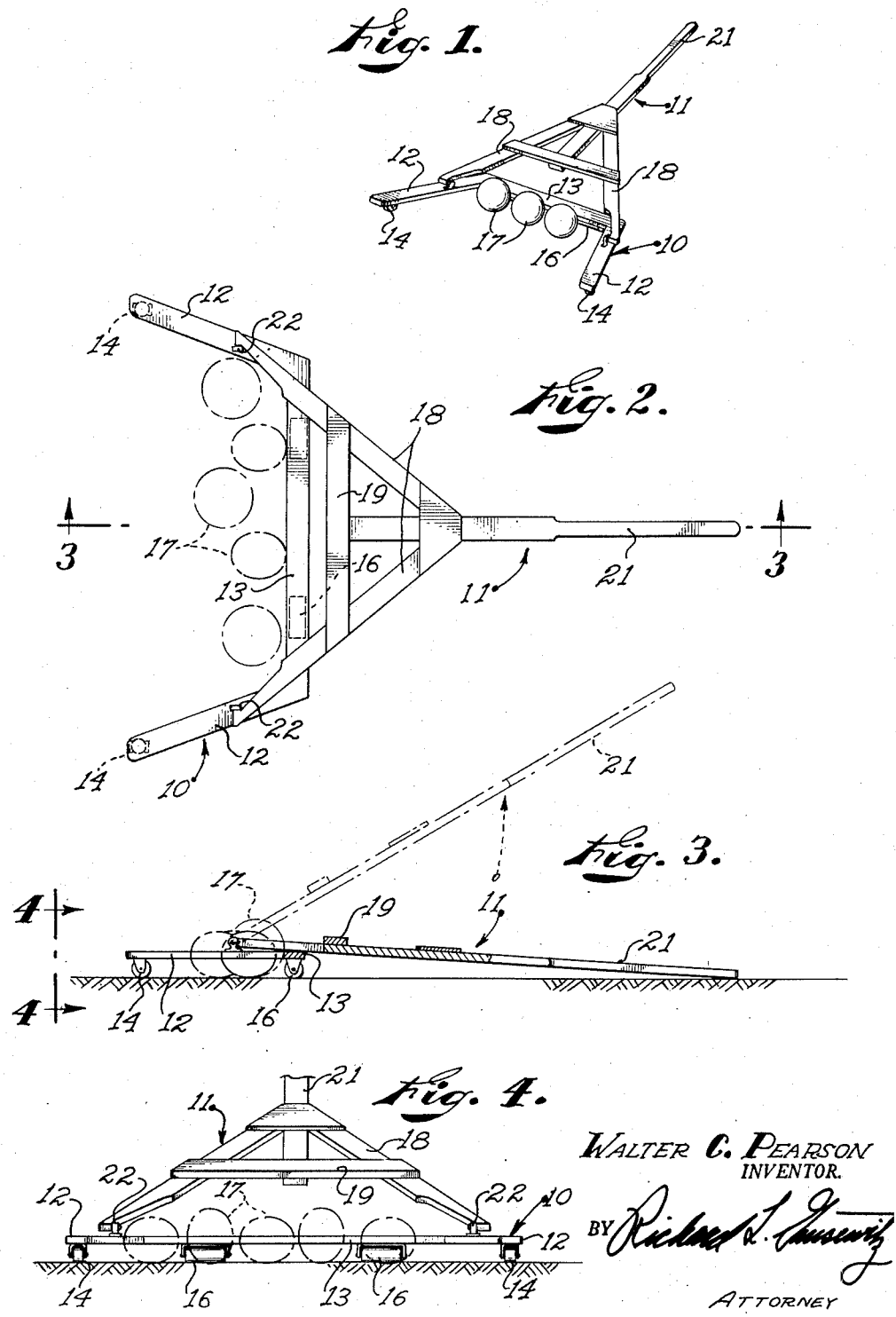

2,817,405

BOWL RETRIEVER

Walter C. Pearson, Corona Del Mar, Calif.

Application August 20, 1956, Serial No. 605,153

6 Claims. (Cl. 171—63)

This invention relates to an apparatus for use in retrieving bowls, and in shifting bowls between opposite ends of a bowling green.

The game of bowls is played upon a green which is formed of special bent grass, the grass being at least as short and sensitive as that used on a golf putting green. Because of the delicacy and sensitivity of the grass, the greens keepers are extremely particular as to the types of bowl retrieving devices which may be employed, it being obvious that any bowl retrieving device which injured the grass would be unsatisfactory.

Further problems in connection with bowl retrieving devices relate to the storage thereof in relatively small spaces, to the use thereof by both tall and short persons and also by relatively weak persons, to the prevention of injury to the bowls, and to the retrieving of the bowls by either a pushing or a pulling operation.

In view of the above factors characteristic of bowl retrieving devices, it is an object of the present invention to provide a bowl retriever which is so constructed that it will not injure even the most sensitive bowling green, yet may be operated by any person in a substantially effortless manner.

A further object of this invention is to provide a bowl retrieving apparatus which is light in weight, which is capable of being either pushed or pulled without injury to the green, which is readily stored in a hanging condition, and which does not require special buffer or bumper devices in order to prevent damage to the bowls.

An additional object is to provide a bowl retrieving apparatus having a hinged handle, the hinges being so located as to uniformly distribute the propelling force to the four wheels of the apparatus, thereby preventing excessive pressure upon any wheel and consequent injury to the bowling green.

These and other objects and advantages of the invention will be more fully set forth in the following specification and claims, considered in connection with the attached drawing to which they relate.

In the drawing:

Figure 1 is a perspective view of a bowl retrieving apparatus constructed in accordance with the present invention;

Figure 2 is an enlarged top plan view of the showing of Figure 1;

Figure 3 is a longitudinal central sectional view of the apparatus, taken on line 3—3 of Figure 2 and showing the handle in several pivoted positions; and Figure 4 is a fragmentary end elevation of the apparatus, taken from station 4—4 indicated in Figure 3.

Referring to the drawing, the apparatus of the invention may be seen to comprise a wheeled collecting frame 10, to which is pivotally connected a handle means 11. As will be described in detail subsequently, the points of pivotal connection between the handle means and the collecting frame are such that the propelling or pushing action transmitted from the handle means to the frame will be evenly distributed among the wheels of the frame, thereby preventing excessive pressure upon any wheel and consequent injury to the bowling green.

More specifically, the wheeled collecting frame 10 is generally trapezoidal in shape, having an open base which faces forwardly. The sides of the trapezoidal frame are numbered 12, and extend forwardly at equal obtuse angles relative to the bearing member or rear side 13 of the frame. Frame 10 is supported by two caster wheels 14 located at the forward ends of frame sides 12, remote from bearing member 13, and by two axially spaced elongated rollers 16 which are mounted beneath the bearing member 13 on suitable journal brackets. Rollers 16 extend longitudinally of the bearing member 13, being preferably formed of wood as are the rims of the caster wheels 14. The collecting frame 10, and also the handle means 11, are likewise formed of wood, the components of such elements being held together by means of glue, screws, etc.

The casters 14 and rollers 16 are adapted to maintain the collecting frame 10 in horizontal position and spaced above the ground a distance sufficient to cause the forward vertical edge of bearing member 13 to bear against standard sized bowls, indicated at 17, at points located slightly below their horizontal diameters. This frame elevation prevents the bearing member 13 from shifting either below or above the bowls. It also prevents the bearing member from pressing the bowls into the green.

The handle means 11 comprises a generally triangular yoke 18, having a cross brace 19, and connected to an elongated handle portion 21 which lies in a plane perpendicular to and bisecting the bearing side 13 of collecting frame 10. The ends of the yoke 18 are hinged to the central portions of frame sides 12 by means of suitable hinges or pivots indicated at 22. It has been found that the hinges 22 must be located in the mid-portions of frame sides 12 in order to prevent excessive downward pressure upon either the casters 14 or rollers 16. Stated otherwise, the location of the hinges 22 is such as to equally distribute the load between the casters and rollers when the collecting frame 10 is pushed by an operator grasping the handle means 11.

In the operation of the bowl retrieving apparatus, the operator grasps the handle 21 and pivots it upwardly to a suitable and comfortable position, which depends upon his height. He then pushes forwardly to cause rolling movement of the collecting frame 10 to various points on the bowling green, the bowls 17 located at such points thus being caused to enter through the open base of the collecting frame and into contact with the bearing member 13. The frame sides 12 prevent any lateral shifting of the bowls away from the bearing member 13. In this manner, any number of bowls 17 are moved to a desired point on the bowling green, with very little effort. Because of the above-described location of the hinge means 22, this pushing operation does not result in any injury to the green.

When it is desired to store the retrieving apparatus, it is merely hung up on a suitable rack, this being possible in a small space because of the presence of the hinged handle.

It is pointed out that the bearing member 13 does not effect any injury to the bowls 17, because it is made of wood instead of metal. Thus, it is not necessary to provide any wooden or rubber buffers or bumpers. The apparatus is extremely light in weight, and may be used by women as well as men. As previously indicated, the hinged handle construction permits use of the apparatus by persons of various heights. The hinged handle also permits pulling of the apparatus when pulling action be desired, since the hinges 22 are constructed to permit 180° rotation of the handle relative to the frame.

Various embodiments of the present invention, in addition to what has been illustrated and described in de-

I claim:

1. Apparatus for retrieving and moving bowls, which comprises a collecting frame having a bearing portion and forwardly extending side portions, said side portions being adapted to prevent lateral movement of collected bowls away from said bearing portion, first wheel means mounted on said bearing portion, second wheel means mounted on said side portions remote from said bearing portion, and handle means pivotally connected to both of said side portions at points intermediate said bearing portion and said second wheel means, the pivotal connections being such as to permit pivotal movement of said handle means about an axis extending generally parallel to said bearing portion, said relationship operating to distribute force transmitted from said handle means substantially equally to all of said wheel means and thus prevent injury to the bowling green.

2. The invention as claimed in claim 1, in which said first wheel means comprise a pair of elongated wooden rollers mounted longitudinally of said bearing portion, and said second wheel means comprise caster wheels located at the forward ends of said side portions remote from said bearing portion.

3. The invention as claimed in claim 1, in which the pivotal connections between said handle means and side portions are disposed substantially midway between said bearing portion and said second wheel means.

4. An apparatus for retrieving bowls from various points on a bowling green, which comprises a generally trapezoidal collecting frame having an open base, a straight bearing portion or member, and two divergent side members extending forwardly from said bearing member and connected thereto at equal obtuse angles, a caster wheel mounted at the forward end of each of said side members and remote from said bearing member, elongated rollers mounted beneath said bearing member and adapted to rotate about an axis extending longitudinally of said bearing member, a generally triangular yoke, a handle element connected to said yoke and lying in a plane perpendicular to said bearing member and bisecting the same, and pivot elements connecting said yoke to said side members at portions located substantially midway between said caster wheels and the intersections of said side members with said bearing member, said pivot elements permitting pivotal movement of said handle element about an axis generally parallel to said bearing member.

5. The invention as claimed in claim 4, in which said bearing member and said side members are formed of wood, and in which said caster wheels and said rollers are adapted to support said bearing member above the ground at an elevation slightly lower than that of the horizontal diameter of a conventional bowl.

6. The invention as claimed in claim 4, in which said pivot elements are adapted to permit pivotal movement of said handle element and said yoke about a 180° angle so that said bearing member may be pulled as well as pushed, and so that said apparatus may be readily stored in a hanging condition.

References Cited in the file of this patent

FOREIGN PATENTS 539,348     Great Britain  _____ Sept. 5, 1941